United States Patent Office 2,915,042
Patented Dec. 1, 1959

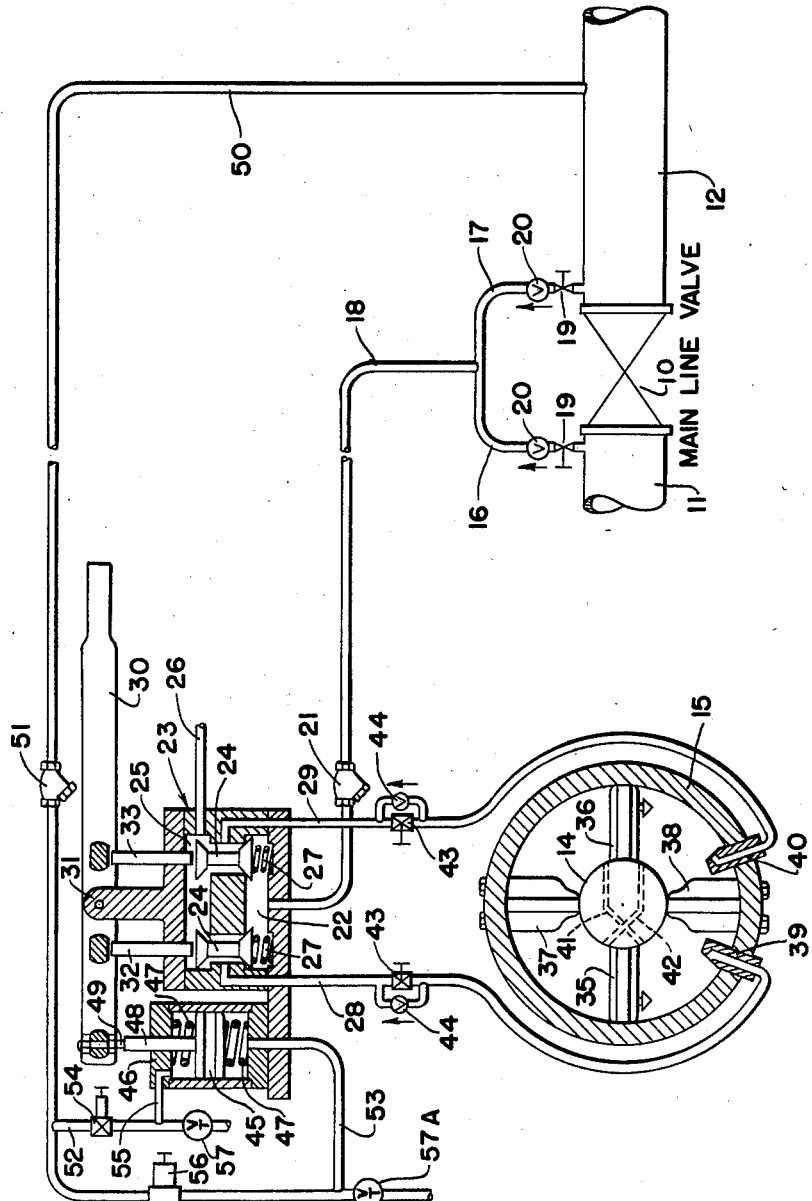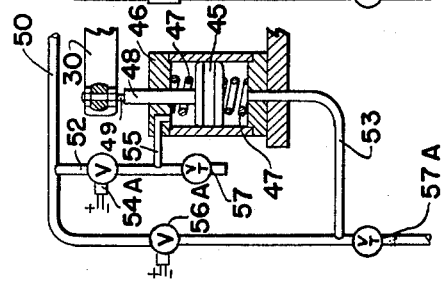

2,915,042

MODULATING PILOT CONTROL RESPONSIVE TO PRESSURE VARIATIONS

Homer J. Shafer, Mansfield, Ohio, assignor to Shafer Valve Company, Mansfield, Ohio, a corporation of Ohio Application February 1, 1955, Serial No. 485,446

8 Claims. (Cl. 121—38)

The invention relates generally to hydraulic or pneumatic operators for pipe line valves, and more particularly to an improved control system whereby the valve is automatically throttled or modulated by variations in line pressure beyond predetermined upper and lower limits to maintain a substantially constant pressure in the line on the downstream side of the valve.

Such a control system must be so arranged that the hydraulic operator may be operated by hand to open or close the valve at any time, and should be designed so that the control handle is normally in a neutral position where no pressure is on the operator. The improved control system utilizes a small pilot to operate the control for the operator of a large valve, and such pilot has the advantage of dependable performance in response to relatively small pressure variations.

An important object of the present invention is to provide improved means to prevent operation of the pilot control due to leakage in the fluid lines connected thereto, and to eliminate pressure on the pilot control as well as on the hydraulic operator when the control is in neutral and the operator is not functioning.

These and other objects are attained by the improved system comprising the present invention, preferred embodiments of which are shown in the acompanying drawings and described herein. Variations in details are comprehended within the scope of the invention defined in the appended claims. The improved system comprises a hydraulic or pneumatic motor connected to the stem of a pipe line valve for opening and closing the same, the motor being connected to the pipe line by a manual control which normally closes off pressure to the motor, the manual control being operable by a pilot which has fluid connections with the pipe line on the downstream side of the valve, there being regulating means in said fluid connections for operating the pilot automatically in response to increases and decreases in pressure beyond predetermined limits, and adjustable orifice bleed-off devices in said fluid connections normally to maintain said pilot in neutral non-operating position.

In the drawings:

Fig. 1 is a schematic view showing the improved system as applied to a rotary vane motor for operating a rotary valve in a pipe line, and having a manual control for connecting the pipe line directly to the pipe line pressure, the control being automatically operable by a pilot regulated by variations in pipe line pressure.

Fig. 3 is a fragmentary schematic view similar to a portion of Figs. 1 and 2, showing a modified arrangement for controlling the pilot by remote means instead of automatically by variations in pipe line pressure.

Figure 2:
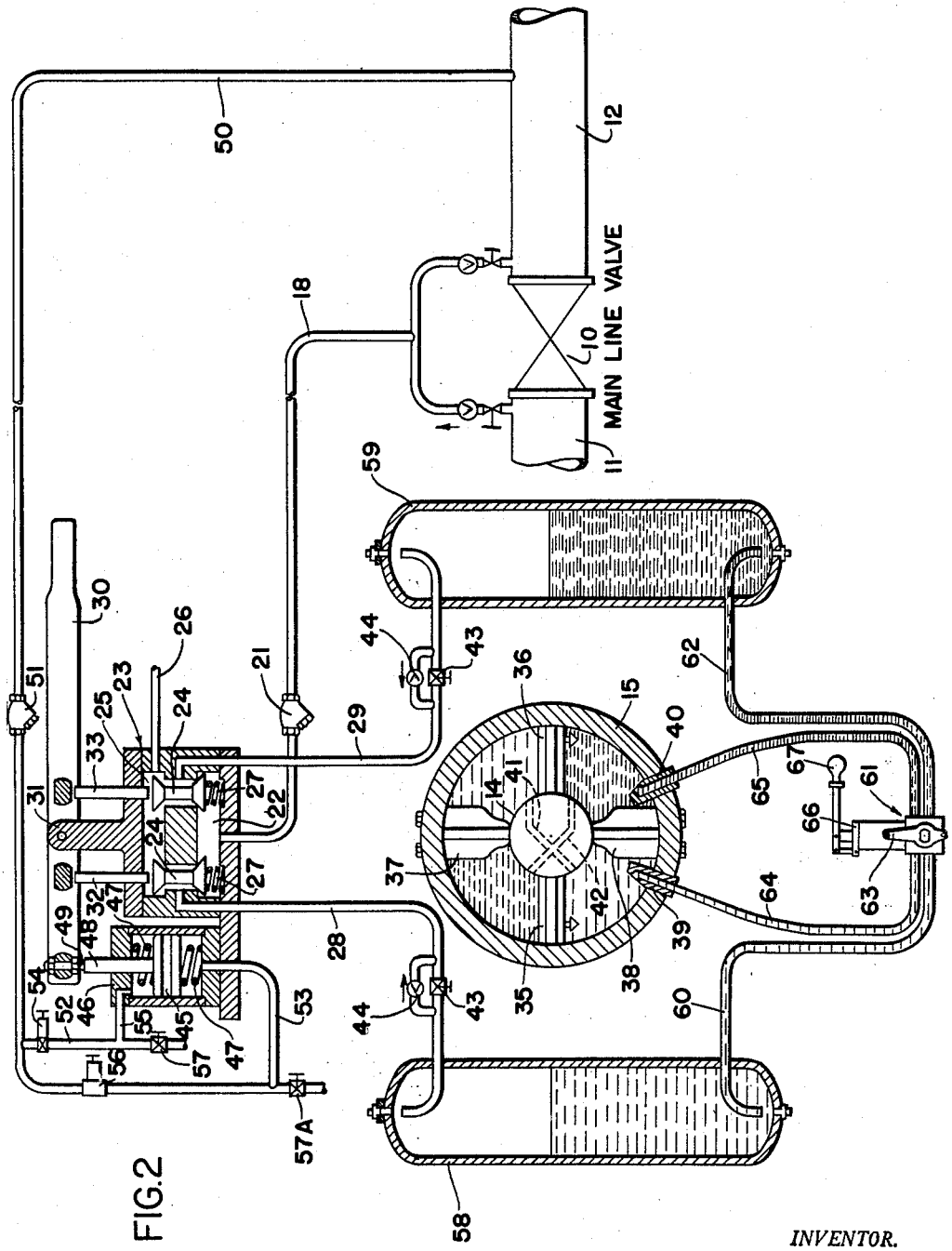
Fig. 2 is a schematic view showing a similar control and pilot, but the control connects the pipe line pressure to oil pressure tanks which in turn are connected to the rotary vane motor in circuit with a reversing valve and hand pump for selective operation of the motor.

In Fig. 1, the pipe line valve to be controlled is indicated schematically at 10, and connects two sections 11 and 12 of the pipe line. The valve 10 may be of the rotary plug type with its stem keyed to the rotor 14 of a rotary vane motor having casing 15 indicated in cross section. However, the invention may be applied to other types of valves operated by hydraulic or pneumatic means, the term "hydraulic" as used herein being intended to cover both hydraulic and pneumatic fluid means.

The pressure fluid which furnishes the power for operating the rotor 14 may be gas or liquid derived from a suitable source, and as shown in Fig. 1 it is derived from the pipe line. Tap lines 16 and 17 from pipe line sections 11 and 12 are both connected to a power line 18 so that pressure fluid will be supplied to the line 18 regardless of a pressure drop or line break on either side of the valve. The lines 16 and 17 are provided with shut-off valves 19, and with check valves 20 preventing return flow in case the pressure fails in either side of the line when the plug valve is closed.

The power line 18 has a filter 21 therein, and is connected to the pressure chamber 22 of a control valve indicated generally at 23, which is a three position valve adapted to connect the power line to one side or the other of the hydraulic motor, and to connect the other side of the motor to exhaust. In the normal neutral position of the control valve the power line is entirely disconnected from the motor. This type of control is disclosed in my prior copending application, Serial No. 348,354, filed April 13, 1953, now Patent No. 2,849,987.

The control 23 has a pair of double-headed poppet valves 24 for connecting the pressure chamber 22 with exhaust chamber 25 connected to atmosphere by pipe 26. Springs 27 normally seat the lower ends of valve 24 on their valve ports to shut off the pressure chamber from the conduits 28 and 29 which connect the ports to opposite sides of the hydraulic motor. A handle 30 for actuating the poppet valves 24 is pivoted intermediate its ends on an arm 31 projecting from the housing of control 23. The handle is adapted to actuate rods 32 and 33 on opposite sides of the pivot for selectively operating the poppet valves 24 and connecting the pressure chamber 22 to one of the conduits 28 or 29 and connecting the other conduit to exhaust chamber 25.

Thus if the handle is rocked to depress actuator rod 32 and open the valve 24 below, the pressure chamber 22 is connected through the valve port to conduit 28 and the top of the valve closes off the valve port from the exhaust chamber. At the same time, conduit 29 is connected through the other valve port to exhaust chamber 25. If the handle is rocked to depress actuator rod 33, the flow to and from the motor is reversed.

Conduits 28 and 29 are connected to the motor on opposite sides of the vanes of the rotor 14. Preferably, the rotor 14 has two diametrically opposite vanes 35 and 36 which rotate through substantially 90° between diametrically opposite stationary shoes 37 and 38. The conduits 28 and 29 may be connected into the motor chamber by nozzles 39 and 40 on opposite sides of one of the shoes. Variable volume chambers are formed between the vanes and shoes, and cross-over ports 41 and 42 are provided, preferably in the rotor 14, for connecting diametrically opposite chambers to exert equal pressure on both vanes 35 and 36 when turning the rotor in either direction. The edges of the vanes and shoes are provided with suitable sealing means, for example O-rings, to make substantially liquid-tight seals between the shoes and the rotor, and between the vanes and the casing.

Each of the conduits preferably has a throttling valve 43 therein for regulating flow to the motor, and a by-pass line having a check valve 44 therein for permitting free flow from the motor around the throttling valve 43.

The handle 30 of the control is automatically operable by a pilot motor having a piston 45 which is controlled by variations in pressure in the pipe line so as to regulate or modulate the degree of opening or closing of the valve 10 to keep a substantially uniform flow of fluid through the pipe line. The pilot piston 45 is movably mounted in a cylinder 46, and springs 47 on either side of the piston normally maintain it in an intermediate or neutral position. The piston is connected by a rod 48 to the end of handle 30 preferably by means of a lost-motion connection 49 which permits independent manual rocking of the handle in either direction sufficient to operate the valves 24, but the full stroke of the piston 45 in either direction will also rock the handle to operate the valves 24.

A conduit line 50 having a filter 51 therein is connected to the downstream section 12 of the pipe line and has a branch line 52 connected to the upper end of pilot cylinder 46, and a branch line 53 connected to the lower end of the cylinder. The branch line 52 is provided with a pressure relief or regulator valve 54 of conventional construction, located between the conduit 50 and the line 55 connecting branch line 52 to the upper end of cylinder 46. This valve 54 is normally closed and may be set to open and connect line 52 to line 55 only in response to a predetermined increase in line pressure, and thus minor fluctuations in line pressure will not affect it.

Between the branch lines 52 and 53, the conduit line has a regulator valve 56 which may be set to open and connect line 50 to line 53 only in response to a predetermined decrease in line pressure, and thus minor fluctuations in line pressure will not affect it. The valves 54 and 56 may be of the spring loaded type shown in Pagenhart Patent No. 794,882.

The branch line 52 is preferably extended beyond line 55 and provided with a constantly open bleed-off or exhaust orifice valve 57, and similarly the conduit line 50 is extended beyond connecting line 53 and provided with a constantly open bleed-off valve 57A.

In the operation of the improved system, assuming that clockwise rotation of the rotor 14 moves the valve 10 toward closed position, and the relief valve 54 is set to open at an upper limit of pressure while the regulator 56 is set to open at a lower limit, as long as the pressure in the main line stays between those limits there is no pressure on the pilot piston and both ends of cylinder 46 are vented to atmosphere through the orifice valves 57 and 57A. Accordingly, the springs 47 hold the piston 45 in neutral position, and the handle 30 is held in neutral position by the springs 27 urging the poppet valves 24 upwardly in substantial abutment with actuator rods 32 and 33. In this position the valves 24 close off the pressure chamber 22 from the motor, so that the vanes of the motor are not subjected to constant pressure, which would tend to cause turning of the rotor when not desired and thus interfere with modulation of the main valve 10. Likewise, in the neutral position of the pilot piston 45 it is not subjected to line pressure which might cause it to move in one direction or the other.

The orifice valves 57 and 57A, being open to exhaust, prevent movement of the pilot piston 45 in either direction due to leakage of the relief valve 54 or the regulator valve 56, both of which are under constant pressure, resulting in consequent movement of the handle and undesired operation of the motor.

Now, should the pressure in line 50 increase sufficiently to open the relief valve 54, pressure fluid will flow through branch line 55 and lower pilot piston 45 before the fluid can escape through orifice valve 57. This movement of piston 45 causes the handle 30 to depress actuator rod 32 and connects conduit 28 with pressure chamber 22, causing the rotor to turn clockwise and rotate the valve 10 toward closed position. When valve 10 has been closed or modulated to reduce the flow in section 12 of the pipe line to a point where the decreased pressure in conduit 50 allows the relief valve 54 to close, the pilot 45 and handle 30 return to neutral and the main valve remains in its modulated position.

Should the pressure in line 50 decrease sufficiently to allow the regulator valve 56 to open, the pressure fluid flowing in line 53 will move the pilot piston upwardly and cause the rotor 14 to turn counterclockwise, rotating the valve 10 toward open position and increasing the flow therethrough until the increased pressure shuts the regulating valve and returns the controls to neutral with the main valve in its wider open position.

At any time the control handle 30 may be operated manually or by remote control electrically, or otherwise, independently of the modulating control. When the control 23 is operated to turn the rotor 14 in either direction, the throttling valves 43 delay the modulating movement of the main valve so that substantial pressure variations of extremely short duration do not modulate the main valve. On the other hand, the check valves 44 allow rapid flow from the exhaust side of the rotor so that it will "stay put" wherever it is moved by the pressure on the pressure side.

Referring to Fig. 2, the connections between the main line sections 11 and 12 and the control valve 23, and between the section 12 and pilot cylinder 46, are identical with those in Fig. 1. The construction of the hydraulic motor comprising rotor 14 and casing 15 is identical in Figs. 1 and 2, but the fluid connections between the control valve 23 and the hydraulic motor differ in the manner hereinafter described. The construction of control valve 23 and pilot valve 46 is also identical in both embodiments.

Referring to the fluid connections between control valve 23 and motor 15, the conduit 28 leads from one side of valve 23 into the top of an oil tank 58, and the conduit 29 leads from the other side of valve 23 into the top of an oil tank 59. The conduits 28 and 29 are provided with throttling valves 43 for regulating flow from the valve 23 to the tanks 58 and 59, and with by-pass lines having check valves 44 for permitting free flow from the tanks around the throttling valves 43 to the valve 23.

The oil tanks may be used to provide oil for passing in a closed circuit to and from the motor when the pressure fluid transmitted from the pipe line through valve 23 is gas, so that the flow to and from the motor can be easily controlled by orifice sizes or choke valves to prevent shock loads on the motor. Moreover, the tanks allow for expansion and contraction of the oil in the motor due to temperature changes.

A conduit 60 connects the bottom of tank 58 with a multi-way control valve indicated generally at 61, and a conduit 62 connects the bottom of tank 59 with control valve 61. When the handle 63 of the control valve 61 is in neutral position as shown in Fig. 2, the valve connects conduit 60 with conduit 64 which is connected to the nozzle 39 of the motor, and connects conduit 62 with conduit 65 which is connected to nozzle 40 of the motor. When it is desired to operate the motor manually to turn the rotor in either direction, the valve handle is turned to the right or left as desired, which connects the hand pump 66 in circuit with one of the conduits 64 or 65 and the corresponding tank, and simultaneously connects the other conduit with the corresponding conduit 60 or 62 leading to the other tank.

The construction and operation of a suitable valve 61 and pump 66 is described in detail in my copending application Serial No. 436,407, filed June 14, 1954, now Patent No. 2,791,093, so that the operation of the motor by means of the hand pump 66 will be described only briefly herein.

Thus, if it is desired to operate the rotor 14 manually in a clockwise direction, the valve handle 63 is turned to the left, in which position the valve connects conduit 60 to the suction side of the pump and conduit 64 to the pressure side, while conduit 65 remains connected to conduit 62. On each upstroke of the pump piston actuated by handle 67, oil is sucked into the pump from tank 58 through conduit 60, and on each downstroke the oil in the pump is forced into the motor through conduit 64 to turn the rotor clockwise, and oil exhausts through conduits 65 and 62 into the tank 59.

To reverse the direction of rotation of the rotor by the hand pump, the control valve 63 is turned to the right to connect the pump in circuit with conduits 65 and 62, and to connect conduit 64 with conduit 60, so that the pump will suck oil from tank 59 and force it through conduit 65 into the motor, while oil exhausts from the motor through conduits 64 and 60 into tank 58.

Because the flow of oil through the motor is always from one tank into the motor, and from the motor into the other tank, regardless of whether the operation is performed by power supplied from the power line or the hand pump, the oil in the motor on opposite sides of the vanes is always in balance and no air gets into the motor.

The embodiment of Fig. 2 incorporates the improved modulating control for a pipe line valve operator into a hydraulic system utilizing oil tanks to transmit gas pressure from the pipe line to the hydraulic motor, while accomplishing all of the purposes and advantages of the invention. Moreover, the multi-way control valve 61 provides for quick selective operation of the hydraulic motor by hand power at any time.

Referring to Fig. 3, if for any reason it is desired to operate the pilot 46 by remote control for actuating the control handle 30 to turn the rotor 14 in either direction, normally closed solenoid valves 54A and 56A may be substituted for pressure relief valve 54 and regulator 56, respectively. The solenoid valves 54A and 56A are electrically connected to a remote control station, solenoid valve 54A being energized to open the valve and conduct pressure from the power line 50 to the pilot and cause clockwise rotation of the rotor 14 and close main valve 10, and solenoid valve 56A being energized to open the valve and conduct pressure from the power line to the pilot and cause counterclockwise rotation of the rotor to open the main valve 10.

In the system of Fig. 3, both ends of the pilot motor cylinder 46 are vented to atmosphere through orifice valves 57 and 57A in the same manner as in Figs. 1 and 2, to prevent the movement in either direction of the pilot piston due to leakage of the solenoid valves 54A and 56A when they are closed and under pressure from the power line 50.

What is claimed is:

1. A modulating pilot control for operating a pipe line valve in response to pressure changes in the line, including a pilot motor, spring means urging the pilot motor to neutral position, fluid connections between opposite sides of said motor and the pipe line for moving the pilot motor in opposite directions, regulating means in said fluid connections for operating said pilot motor automatically in response to increases and decreases beyond predetermined limits in pressure in said pipe line, and adjustable orifice constantly open exhaust means connected to opposite sides of said pilot motor normally to maintain said pilot motor in neutral non-operating position.

2. A modulating pilot control for operating a pipe line valve in response to pressure changes in the line, including a pilot motor, spring means urging the pilot motor to neutral position, a first fluid connection between one side of the motor and the pipe line for moving the motor in one direction, regulating means in said fluid connection for operating said pilot motor automatically in response to an increase beyond a predetermined limit in pressure in said pipe line, a second fluid connection between the other side of said motor and the pipe line for moving the motor in the opposite direction, regulating means in said second fluid connection for operating said pilot motor automatically in response to a decrease beyond a predetermined limit in pressure in said pipe line, and adjustable orifice constantly open bleed-off devices connected to said first and second fluid connections between the regulating means and said pilot motor normally to maintain said pilot motor in neutral non-operating position.

3. A modulating pilot control for a pipe line valve operator including a pressure-responsive pilot motor having spring means normally maintaining the pilot motor in neutral position, a main conduit for connection to the pipe line, a first branch line connecting said conduit to one side of the pilot motor, a pressure relief valve in said branch line for opening in response to a predetermined increase in pressure, adjustable orifice constantly open exhaust means connected to said branch line between said pressure relief valve and said pilot motor, a second branch line connecting said main conduit to the other side of the pilot motor, a regulator valve in said second branch line for opening in response to a predetermined decrease in pressure, and adjustable orifice constantly open exhaust means connected to said second branch line between said regulator valve and said pilot motor.

4. A modulating pilot control for a pipe line valve operator including a pressure-responsive pilot motor having spring means normally maintaining the pilot motor in neutral position, a main conduit for connection to the pipe line, a first branch line connecting said conduit to one side of the pilot motor, a pressure relief valve in said branch line for opening in response to a predetermined increase in pressure, a second branch line connecting said main conduit to the other side of the pilot motor, a regulator valve in said second branch line for opening in response to a predetermined decrease in pressure, and adjustable orifice constantly open bleed-off devices connected to opposite sides of said pilot motor.

5. A hydraulic modulating pilot control for a pipe line valve including a fluid motor operatively connected to the valve for opening and closing the same, fluid connections between the pipe line and the motor, adjustable orifice means in the fluid connections for metering the flow toward the motor, by-pass connections around said adjustable orifice means and having check valves allowing free flow away from said motor, a pressure-responsive pilot control for the fluid motor including a pilot motor, spring means urging the pilot motor to neutral position, fluid lines connecting said pipe line with opposite sides of said pilot motor for moving said pilot motor in opposite directions, regulating means in said fluid lines for operating said pilot motor automatically in response to increases and decreases in pressure in said pipe line, and adjustable orifice constantly open bleed-off means connected to opposite sides of said pilot motor.

6. A modulating pilot control for operating a pipe line valve in response to pressure changes in the line, including a pilot motor, spring means urging the pilot motor to neutral position, fluid connections between opposite sides of said motor and the pipe line for moving the pilot motor in opposite directions, normally closed regulating valve means in said fluid connections for operating said pilot motor selectively in opposite directions by the pressure in said pipe line, and adjustable orifice constantly open exhaust means connected to opposite sides of said pilot motor normally to maintain said pilot motor in neutral non-operating position.

7. A modulating pilot control for operating a pipe line valve in response to pressure changes in the line, including a pilot motor, fluid connections between opposite sides of said motor and the pipe line for moving the pilot motor in opposite directions, normally closed solenoid valves in said fluid connections operable by remote control for operating said pilot motor selectively in opposite directions by the pressure in said pipe line, and adjustable orifice exhaust means connected to opposite sides of said pilot motor normally to maintain said pilot motor in neutral non-operating position.

8. A modulating pilot control for operating a pipe line valve in response to pressure changes in the line, including a pilot motor, spring means urging the pilot motor to neutral position, regulating means connected to the pilot motor for operating said motor automatically in response to increases and decreases beyond predetermined limits in pressure in said pipe line, fluid connections between said regulating means and said pipe line, and adjustable orifice bleed-off devices connected to opposite sides of said pilot motor to maintain it in neutral non-operating position.

References Cited in the file of this patent

UNITED STATES PATENTS

| | | |
|---|---|---|
| 794,882 | Pagenhart | July 18, 1905 |
| 840,876 | Steedman | Jan. 8, 1907 |
| 1,239,566 | Conrader | Sept. 11, 1917 |
| 2,000,270 | Andrews et al. | May 7, 1935 |
| 2,013,665 | Messier | Sept. 10, 1935 |
| 2,082,940 | Brisbane | June 8, 1937 |
| 2,273,171 | Bennett | Feb. 17, 1942 |
| 2,317,383 | Hull | Apr. 27, 1943 |
| 2,500,777 | Timmerman | Mar. 14, 1950 |
| 2,582,626 | Escher | Jan. 15, 1952 |

FOREIGN PATENTS

| | | |
|---|---|---|
| 138,726 | Great Britain | Feb. 19, 1920 |
| 581,665 | Great Britain | Oct. 21, 1946 |